United States Patent
Grinstead

(10) Patent No.: US 9,900,372 B2
(45) Date of Patent: Feb. 20, 2018

(54) TECHNIQUES TO DETECT AND REACT TO PROXY INTERFERENCE

(71) Applicant: WhatsApp Inc., Mountain View, CA (US)

(72) Inventor: Joseph Edward Grinstead, Mountain View, CA (US)

(73) Assignee: WHATSAPP INC., Menlo Park, CA (US)

( * ) Notice: Subject to any disclaimer, the term of this patent is extended or adjusted under 35 U.S.C. 154(b) by 205 days.

(21) Appl. No.: 15/004,540

(22) Filed: Jan. 22, 2016

(65) Prior Publication Data

US 2017/0214732 A1 Jul. 27, 2017

(51) Int. Cl.
G06F 15/16 (2006.01)
H04L 29/08 (2006.01)
H04L 29/06 (2006.01)

(52) U.S. Cl.
CPC ............ H04L 67/02 (2013.01); H04L 67/147 (2013.01); H04L 67/28 (2013.01); H04L 67/42 (2013.01)

(58) Field of Classification Search
USPC ................. 709/203, 206, 217, 230
See application file for complete search history.

(56) References Cited

U.S. PATENT DOCUMENTS

| | | | |
|---|---|---|---|
| 6,665,300 B1 * | 12/2003 | Caves | H04L 12/5601 370/230 |
| 2007/0136814 A1 * | 6/2007 | Lee | G06F 21/552 726/25 |
| 2007/0177615 A1 * | 8/2007 | Miliefsky | H04L 29/06027 370/401 |
| 2012/0331300 A1 * | 12/2012 | Das | H04L 69/164 713/176 |
| 2014/0067491 A1 * | 3/2014 | James | G06Q 50/30 705/13 |

* cited by examiner

Primary Examiner — Liangche A Wang

(57) ABSTRACT

Techniques to detect and react to proxy interference are described. In one embodiment, an apparatus may comprise a first network protocol component operative to receive a first network connection initiation attempt from a client at a server; determine that the first network connection initiation attempt is malformed; extract a cookie from the first network connection initiation attempt, the cookie comprising a client identifier; a client record component operative to record a malformed network connection initiation record in response to determining that the first network connection initiation attempt is malformed; and a second network protocol component operative to receive a second network connection initiation attempt from the client at the server; extract the cookie from the second network connection initiation attempt; and transmit a malformed network connection message to the client based on the malformed network connection initiation record. Other embodiments are described and claimed.

20 Claims, 13 Drawing Sheets

700

- Receive a first network connection initiation attempt from a client at a server, the first network connection initiation attempt based on a first network communication protocol.
  702

- Determine that the first network connection initiation attempt is malformed.
  704

- Extract a cookie from the first network connection initiation attempt, the cookie comprising a client identifier.
  706

- Record a malformed network connection initiation record in response to determining that the first network connection initiation attempt is malformed, the malformed network connection initiation record associated with the client based on the client identifier.
  708

- Reject the first network connection initiation attempt based on the first network connection initiation attempt being malformed.
  710

- Receive a second network connection initiation attempt from the client at the server, the second network connection initiation attempt based on a second network communication protocol.
  712

- Extract the cookie from the second network connection initiation attempt, the cookie comprising the client identifier.
  714

- Retrieve the malformed network connection initiation record based on the client identifier.
  716

- Transmit a malformed network connection message to the client based on the malformed network connection initiation record.
  718

*FIG. 7*

TECHNIQUES TO DETECT AND REACT TO PROXY INTERFERENCE

BACKGROUND

Client and server devices may interact with each other using a communications network such as the Internet. Clients may include applications executing within a web browser on a computing device. Clients executing within a web browser may communicate using various portions, components, elements, or extensions of the hypertext transport protocol (HTTP) or hypertext transport protocol secure (HTTPS). Clients may operate within a complex network environment and encounter various considerations that complicate their operation.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to detect and react to proxy interference. Some embodiments are particularly directed to techniques to detect and react to proxy interference with a communication protocol. In one embodiment, for example, an apparatus may comprise a first network protocol component operative to receive a first network connection initiation attempt from a client at a server, the first network connection initiation attempt based on a first network communication protocol; determine that the first network connection initiation attempt is malformed; extract a cookie from the first network connection initiation attempt, the cookie comprising a client identifier; and reject the first network connection initiation attempt based on the first network connection initiation attempt being malformed; a client record component operative to record a malformed network connection initiation record in response to determining that the first network connection initiation attempt is malformed, the malformed network connection initiation record associated with the client based on the client identifier; and retrieve the malformed network connection initiation record based on the client identifier; and a second network protocol component operative to receive a second network connection initiation attempt from the client at the server, the second network connection initiation attempt based on a second network communication protocol; extract the cookie from the second network connection initiation attempt, the cookie comprising the client identifier; and transmit a malformed network connection message to the client based on the malformed network connection initiation record. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 7 illustrates an embodiment of a logic flow for the system of FIG. 1.

DETAILED DESCRIPTION

Figure 1:
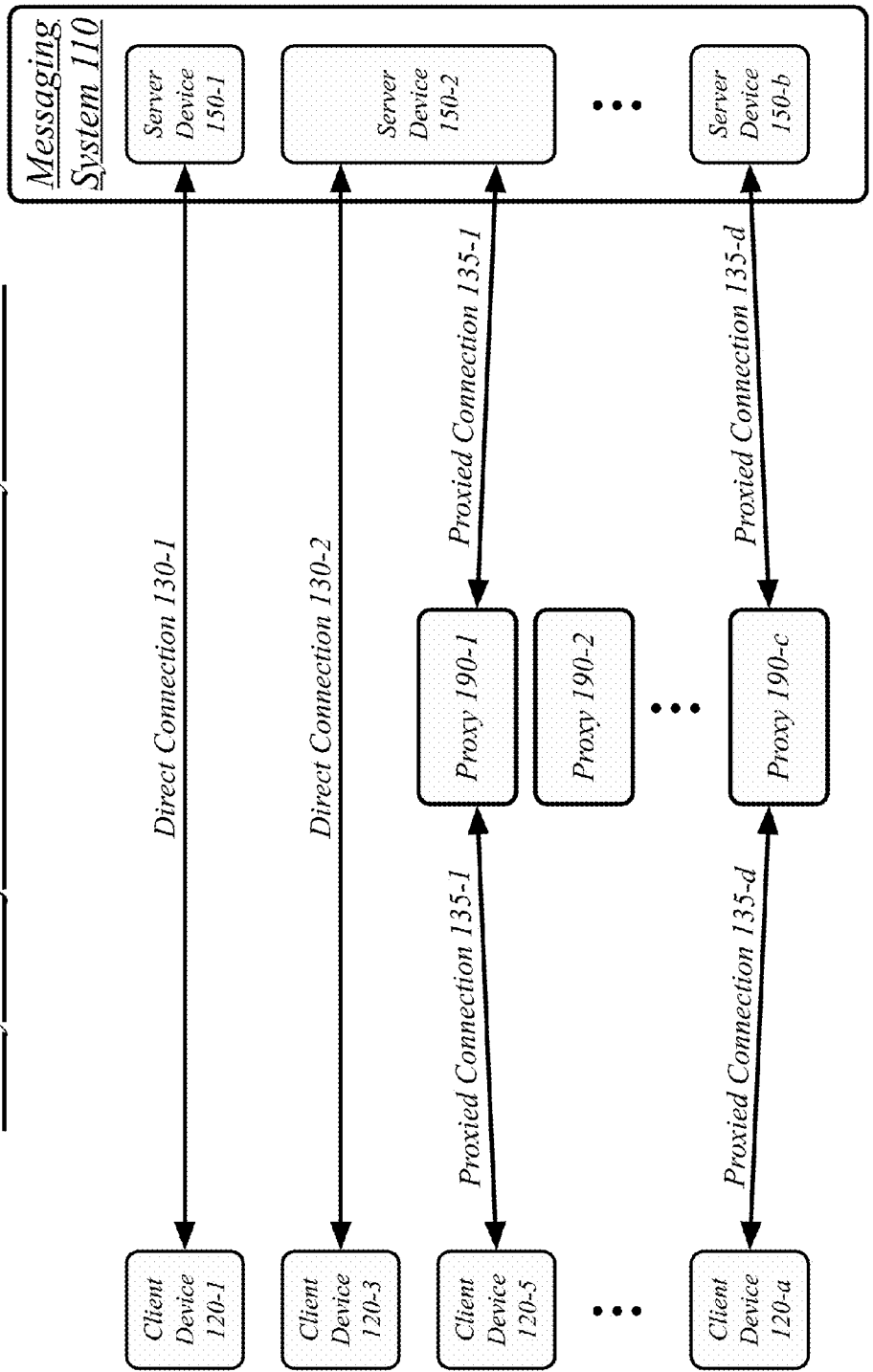
FIG. 1 illustrates an embodiment of a proxy interference detection system.

Server devices may support rich network protocols that depend on specific settings of the communications headers for their communication protocol. Networks may include network devices, such as proxies, that perform actions to improve and otherwise modify the operation of a communications network. However, some of these actions may modify the operations of communication protocols, such as by modifying communication headers, and may thereby interfere with the operation of the communication protocols.

For instance, a network proxy may mediate in a client's interactions with a server. A proxy may, for example, modify an HTTP header for an HTTP or HTTPS connection to introduce alternative header settings intended to improve network performance. In many use cases, these modifications may improve network performance without negatively impacting users. However, web applications using specific protocols or specific elements of protocols may be disrupted by these modifications. As such, it may be beneficial to detect the presence of a proxy interfering with a network connection in order to inform a user as to why a web application is unavailable and to inform the user as to possible proxy reconfigurations that may resolve the problem. As a result, the embodiments can improve the performance of a web application system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a proxy interference detection system 100. In one embodiment, the proxy interference detection system 100 may comprise a computer-implemented system having software applications comprising one or more components. Although the proxy interference detection system 100 shown in FIG. 1 has a limited number of elements in a certain topology, it may be appreciated that the proxy interference detection system 100 may include more or less elements in alternate topologies as desired for a given implementation.

A messaging system 110 may be generally arranged to receive, store, and deliver messages. The messaging system 110 may store messages while messaging clients, such as may execute on client devices 120 are offline and deliver the messages once the messaging clients are available. The messaging system 110 may empower the engagement and performance of other communication tasks, such as audio and/or video calls. The messaging system 110 may be implemented by a plurality of server devices 150.

A plurality of client devices 120 may operate as part of the proxy interference detection system 100, transmitting messages and otherwise communicating between each other as part of a messaging system 110. The client devices 120 may execute messaging clients for the messaging system 110, wherein each of the client devices 120 and their respective messaging clients are associated with a particular user of the messaging system 110. In some embodiments, the client devices 120 may be cellular devices such as smartphones and may be identified to the messaging system 110 based on a phone number associated with each of the client devices 120. In some embodiments, the client devices 120 may be identified to the messaging system 110 based on a user account registered with the messaging system 110—and potentially a social networking system that comprises or is associated with the messaging system 110—and logged into from the messaging client executing on the client devices 120. In general, each messaging client may be addressed through various techniques for the reception of messages. While in some embodiments the client devices 120 may comprise cellular devices, in other embodiments one or more of the client devices 120 may include personal computers, tablet devices, any other form of computing device without limitation. Personal computers and other devices may access a messaging system 110 using web browser accessing a web server, for instance.

Network connections within the messaging system 110 may be performed as direction connections 130 or as proxied connections 135. A direct connection may correspond to a network connection in which the network packets from a client device are not mediated by a proxy. A proxied connection may correspond to a network connection in which the network packets from a client device are mediated by a proxy. In some embodiments, a proxy may be external to a client device, such as by a proxy device or proxy server device on the communication network used by a client device. In some embodiments, a proxy may be internal to a client device, such as may be implemented as local software on a client device.

The client devices 120 may communicate using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as each of client devices 120 and server devices 150, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein.

Proxy interference detection system 100 may include an authorization server (or other suitable component(s)) that allows users to opt in to or opt out of having their actions logged by proxy interference detection system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of proxy interference detection system 100 and other elements of a messaging system 110 through blocking, data hashing, anonymization, or other suitable techniques as appropriate. For instance, a user may be empowered to configure privacy settings determining whether network usage is logged by the proxy interference detection system 100 and analyzed. In some embodiments, a user may be presented with information regarding may be collected and how that information may be used, such as informing the user that collected information may be anonymized prior to analysis.

Figure 2:
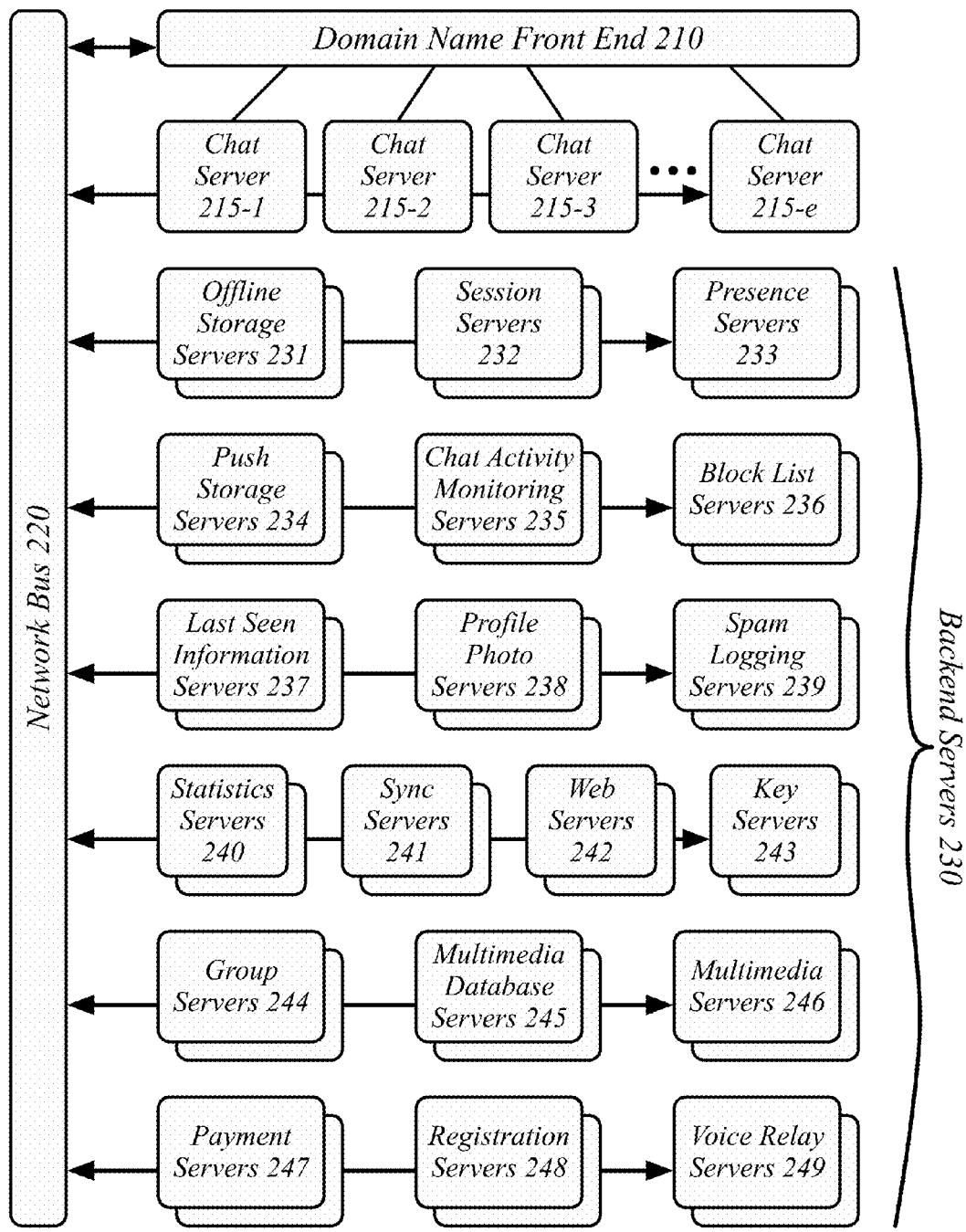
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the streaming audio system 100 with the operations of the streaming audio system 100 comprising a portion of the overall operations of the messaging system 200. The illustrated embodiment of the messaging system 200 may particularly correspond to a portion of the messaging system 110 described with reference to FIG. 1 comprising one or more server devices providing messaging services to the user of the messaging system 200.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the messaging web access system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3:
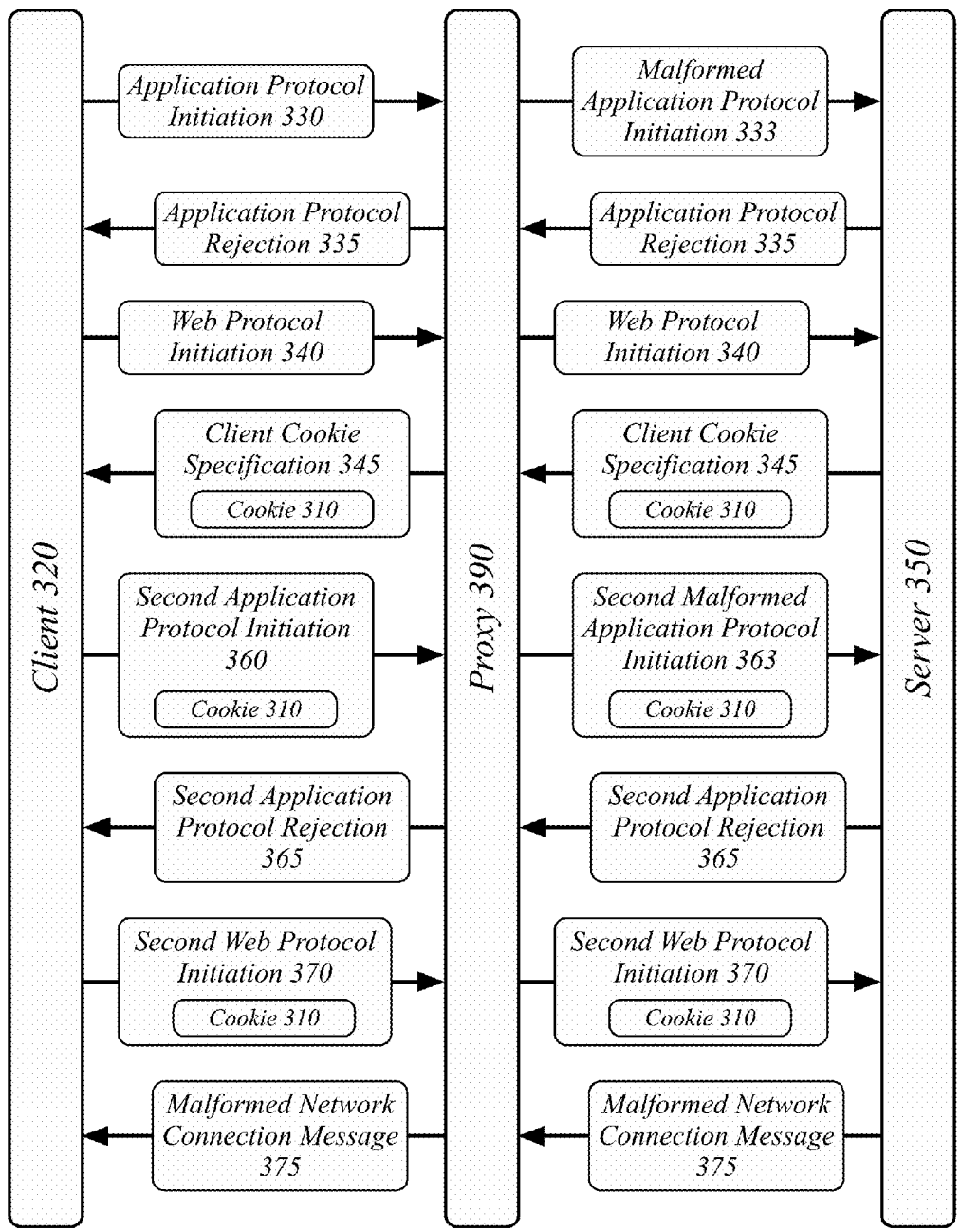
FIG. 3 illustrates an embodiment of a application protocol initiation interaction.

FIG. 3 illustrates an embodiment of a application protocol initiation interaction. The application protocol initiation interaction may correspond to an attempt by a client 320 to initiate a network connection with a server 350 using a communications network that includes a proxy 390 acting as an intermediary between the client 320 and the server 350. The application protocol initiation interaction may generally proceed from the top to the bottom of FIG. 3 as an exchange of messages between the client 320 and the server 350 as mediated by the proxy 390.

The client 320 may comprise a web application executing in a web browser on a client device. The web application may be a front end to a server system, such as a messaging system 110. The web application may empower using a web system to access the server system via a web browser. The web application may attempt to initiate a full-duplex communications channel with the server system for the performance of the operations of the web application. The web application may use a full-duplex communications protocol that includes an emulation of a HTTP or HTTPS handshake as an element of the protocol, the HTTP or HTTPS emulation used to gain access to server functions via a web server expecting incoming HTTP or HTTPS connection. The HTTP or HTTPS emulation may further empower the web application to traverse firewalls allowing web traffic. The application protocol may comprise the WebSocket protocol, in which the WebSocket handshake resembles an HTTP or HTTPS connection upgrade request.

The client 320 may transmit an application protocol initiation 330 to the server 350 mediated by the proxy 390. The application protocol initiation 330 may comprise at least a portion of a handshake for the application protocol, such as an emulation of a HTTP connection upgrade request. The proxy 390 may modify the application protocol initiation 330 to produce the malformed application protocol initiation 333. The modification of the application protocol initiation 330 by the proxy 390 may be performed by the proxy 390 in an attempt to improve network performance. For example, if the application protocol emulates the handshake for another protocol, a modification intended to improve the performance of connections using the other protocol and reasonable for use with the other protocol may break the application protocol. Specifically, an HTTP connection upgrade request emulated by the WebSocket protocol may be replaced with a keep-alive request by the proxy 390 in an attempt to reduce the recreation of HTTP connections by increasing the reuse of HTTP connections in the network. This keep-alive request may be functional when used on an actual HTTP connection, but may produce a malformed application protocol initiation 333 when used with another protocol, such as the WebSocket protocol. A protocol initiation may be malformed when it fails to abide by the specification for the protocol.

The server 350 may respond to the malformed application protocol initiation 333 with an application protocol rejection 335 because of the malformation of the initiation request. This application protocol rejection 335 may be transmitted via the proxy 390 back to the client 320.

The client 320 may react to an application protocol rejection 335 with an attempt to initiation a web protocol transaction with the server 390 using a web protocol initiation 340. In some embodiments, the web protocol transaction may be used to detect if the server 390 is available on the network accessible to the client 320, to determine if the server 390 is generally reachable by and responsive to the client 320. In some embodiments, the web protocol initiation 340 may comprise an actual HTTP request, and may therefore be mediated without malformation—though possibly still with modification—by the proxy 390. As such, a web connection created by the web protocol initiation 340 may be available for the communication of information between the client 320 and server 390. However, the web connection may be inappropriate for some desired activities of the client 320, such as the performed of general full-duplex communication, such as may be used in using the client 320 as a frontend to a messaging system 110.

Where a web connection can be successfully created, as in the illustrated embodiment, the client 320 may be configured to re-try an initiation of the application protocol. The web application may be unaware that the initiation of the application protocol is unavailable despite any confirmed network connectivity due to the interference of the proxy 390. The error reporting features of the application protocol or a particular implementation of the application protocol may be insufficiently rich to inform the client 320 of the interference by the proxy 390. Therefore, the server 390 may be configured to use the web connection to communicate to the client 320 information regarding the failure of the application protocol initiation 330.

However, the communication of the problem and information regarding its possible solution may be furthered by including and analyzing information received as part of the application protocol initiation 330. However, the server 350 might not be operative to identify a particular malformed application protocol initiation 333 for the client 320 from which it received the web protocol initiation 340. As such, the server 350 may store a cookie 310 (e.g., an HTTP cookie, a web cookie, an Internet cookie, a browser cookie) identifying the client 320 to the server 350 on the client 320 in a client cookie specification 345 sent as a response to the web protocol initiation 340. The cookie 310 may record a client identifier unique to the client 320 within an identifier namespace for the server 390 and/or messaging system 110.

With the web protocol connection having been successfully performed, the client 320 may transmit a second application protocol initiation 360 to the server 350 mediated by the proxy 390. The second application protocol initiation 360 may include the cookie 310 set by the server 350. The proxy 390 may modify the second application protocol initiation 360 into a second malformed application protocol initiation 363, the second malformed application protocol initiation 363 still comprising the cookie 310.

The server 350 may respond to the second malformed application protocol initiation 363 with a second application protocol rejection 365 because of the malformation of the initiation request. This second application protocol rejection 365 may similarly be transmitted via the proxy 390 back to the client 320. Further, the server 350 may detect the cookie 310 and therefore log information for the malformed application protocol initiation 333 in association with the client identifier included within the cookie 310. This information may be logged in order to aid the user of the client 320 in understanding and responding to the malformation caused by the proxy 390 interfering with communication between the client 320 and the server 350.

The client 320 may again react to an application protocol rejection with an attempt to initiation a web protocol transaction with the server 390 using a second web protocol initiation 370. The second web protocol initiation 370 may also include the cookie 310 set by the server 350. The second web protocol initiation 370 may be mediated without malformation—though possibly again still with modification—by the proxy 390. As such, a web connection created by the second web protocol initiation 370 may again be available for the communication of information between the client 320 and server 390.

Because the web connection is available for communication between the client 320 and the server 350, and because the cookie 310 can be used to identify the client 320, the server 350 may response to the second web protocol initiation 370 with a malformed network connection message 375 communication information regarding the failure of the second application protocol initiation 360 for which it has information stored. The malformed network connection message 375 may include a record of the second malformed application protocol initiation 363. The malformed network connection message 375 may include information explaining the network connection problem and the manner in which a proxy may interfere with network connection. The malformed network connection message 375 may include instructions for reconfiguring a proxy so as to not interfere with the application protocol.

It will be appreciated that in some embodiments, a cookie 310 for the messaging system 110—or for an encompassing system, such as a social-networking system—may already be present on the client 320. In these embodiments, an initial application protocol initiation may be received including the cookie 310. In these embodiments, the exchanges 330, 333, 335, 340, and 345 may be excluded, with the caching of malformation information and providing of the information to the client 320 by the server 390 being performed immediately in response to the initial application protocol initiation. In these embodiments, the operations of the client 320 and the server 390 may generally correspond to the second-stage exchanges described herein, the exchanges 360, 363, 365, 370, and 375, which may be performed once a cookie 310 is present in the application protocol initiation and web protocol initiation by the client 320.

Figure 4A:
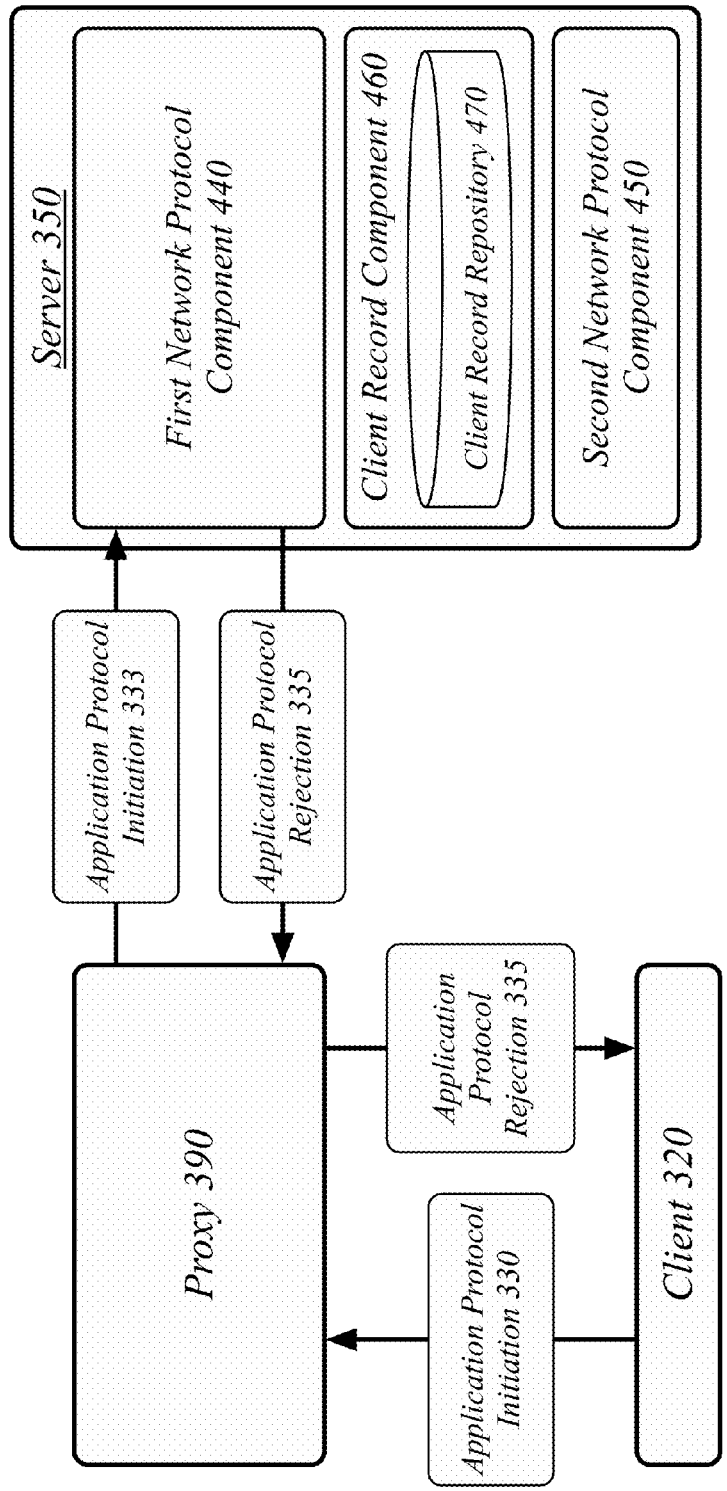
FIG. 4A illustrates an embodiment of a application protocol initiation.

FIG. 4A illustrates an embodiment of a application protocol initiation.

A server 350 may comprise a plurality of components. The plurality of components may comprise software components comprising portions of a software application. The operations of the plurality of components may include software operations and hardware operations. The server 350 may comprise additional or alternative components for the performance of the operations of the proxy interference detection system 100. The server 350 may comprise a first network protocol component 440, second network protocol component 450, and client record component 460. The first network protocol component 440 may be generally arranged to engage in network communication interactions based on a first network protocol, such as a full-duplex communication protocol. The second network protocol component 450 may be generally arranged to engage in network communication interactions based on a second network protocol, such as the HTTP protocol, the second network protocol different from the first network protocol. The client record component 460 may be generally arranged to store records of malformed network connections in association with client identifiers for clients. The client record component 460 may comprise a client repository component 470, the client repository component generally arranged to store records related to the operation of the server 350 and specifically records comprising information regarding malformed protocol requests.

The first network protocol component 440 may be generally arranged to receive a network connection initiation attempt as an application protocol initiation 330 from a client 320. The network connection initiation attempt may be based on a first network communication protocol, using the first network communication protocol to define the interactions of the network connection initiation attempt. The first network communication protocol may comprise a full-duplex communication protocol. The first network communication protocol may include an emulation of a hypertext transport protocol handshake so as to allow for the bridging of a network firewall.

The first network protocol component 440 may determine that the network connection initiation attempt is malformed. The first network connection initiation attempt may have been malformed based on a header modification made by a proxy 390 retransmitting the network connection initiation attempt. The first network protocol component 440 may determine that the network connection initiation attempt is malformed by determining that the header for an application protocol initiation 330 does not match the network protocol.

The first network protocol component 440 may reject the first network connection initiation attempt based on the first network connection initiation attempt being malformed. The first network protocol component 440 may determine that the network connection initiation attempt lacks a cookie and that, therefore, the client 320 is not available to be identified by the server 350. As such, the first network protocol component 440 may log information related to the malformed network connection initiation attempt but not in a form available for retrieval for reporting to the client 320.

In some embodiments, identifiers other than a cookie may be used. For example, a client 320 may be identifier based on a listed user agent, an internet protocol (IP) address, or additional or alternative headers. In general, any known technique for identifying a client 320 based on a web protocol initiation may be used to identify the client 320 for the purposes of communicating malformed network connection information to the client 320.

Figure 4B:
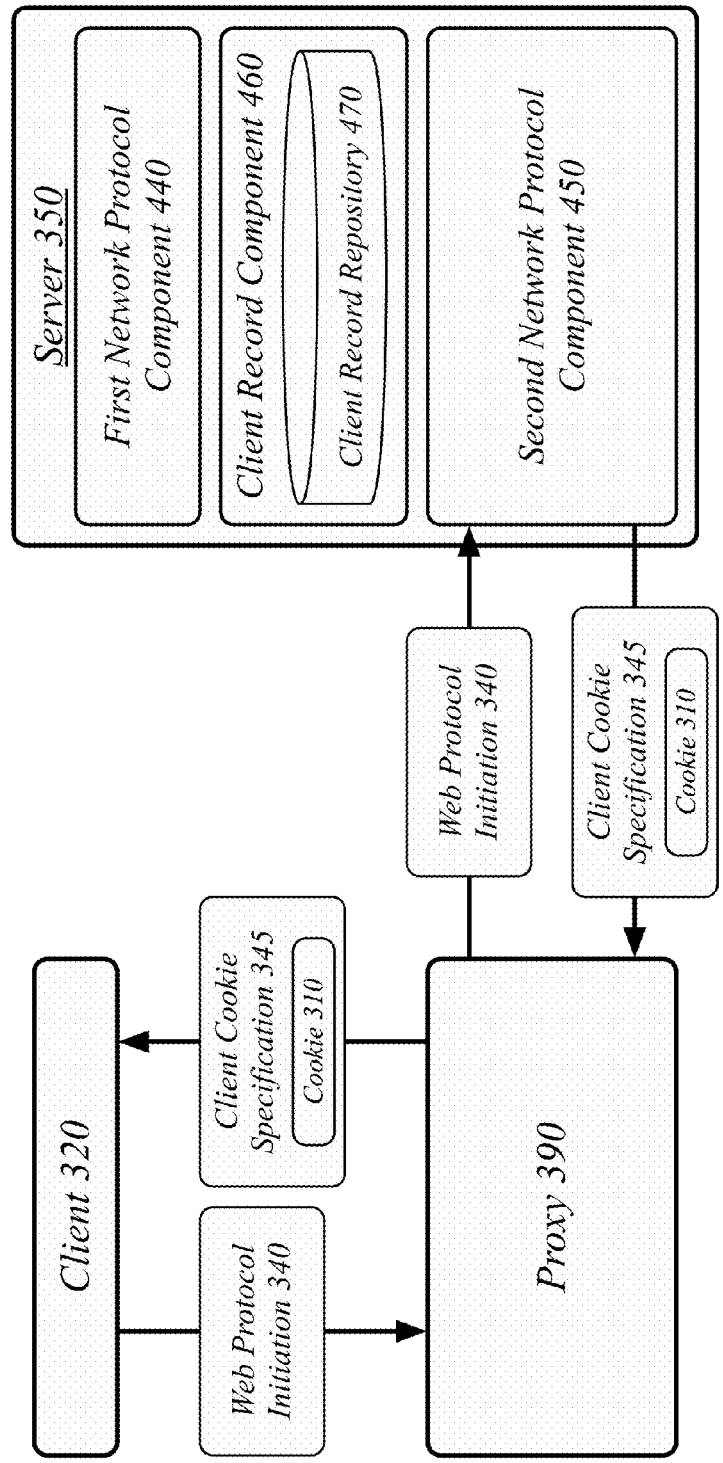
FIG. 4B illustrates an embodiment of a web protocol initiation.

FIG. 4B illustrates an embodiment of a web protocol initiation.

The second network protocol component 450 may be generally arranged to receive another network connection initiation attempt from the client 320 as a web protocol initiation 340. This network connection initiation attempt may be based on a second network communication protocol different from the first network communication protocol, using the second network communication protocol to define the interactions of the network connection initiation attempt. The second network communication protocol may comprise HTTP. The client 320 may perform this network connection initiation attempt automatically in response to the server 350 rejecting the previous network connection initiation attempt via the application protocol rejection 335.

The second network protocol component 450 may determine that the network connection initiation attempt does not include a cookie identifying the client 320. As a result, the second network protocol component 450 may set a cookie 310 on the client 320 in response to the network connection initiation attempt via a client cookie specification 345 network transaction. The cookie 310 may comprise a client identifier for the client 320.

Figure 5A:
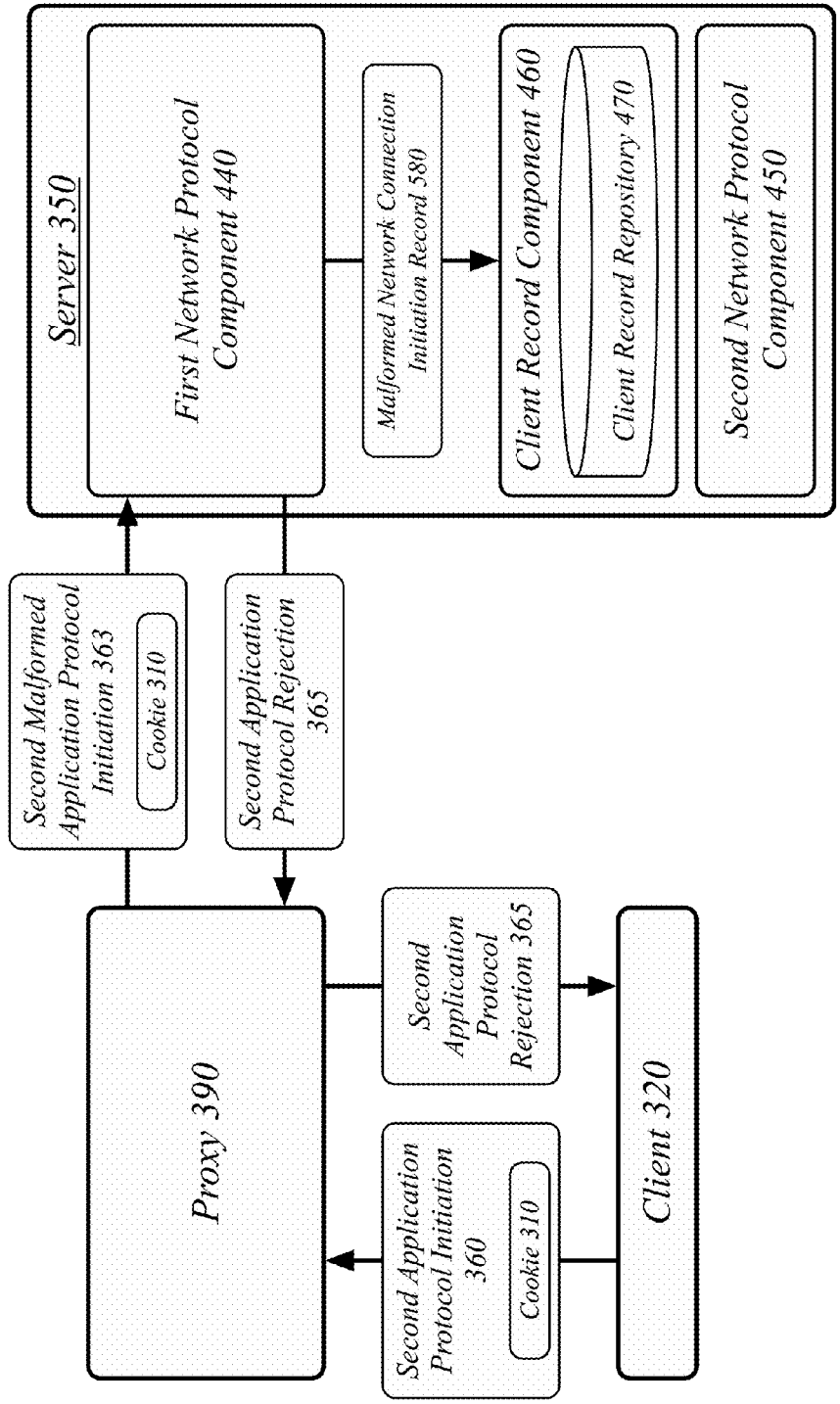
FIG. 5A illustrates an embodiment of a second application protocol initiation.

FIG. 5A illustrates an embodiment of a second application protocol initiation.

The first network protocol component 440 may receive another network connection initiation attempt from the client 320. This network connection initiation attempt may be based on the first network communication protocol. The first network protocol component 440 may determine that the first network connection initiation attempt is malformed. The first network protocol component 440 may determine that the network connection initiation attempt is malformed by determining that the header for an application protocol initiation 330 does not match the network protocol.

The first network protocol component 440 may determine that the network connection initiation attempt includes a cookie 310. The first network protocol component 440 may extract a cookie 310 from the network connection initiation attempt. The cookie 310 may comprise a client identifier identifying the client 320. The first network protocol component 440 may reject the network connection initiation attempt based on the network connection initiation attempt being malformed.

The client record component 460 may be generally arranged to record a malformed network connection initiation record 580 in response to determining that a network connection initiation attempt is malformed. The malformed network connection initiation record 580 may be associated with the client based on the client identifier. The client record repository 470 may include a plurality of malformed network connection initiation records indexed by their associated client identifiers.

A network connection initiation attempt may comprise one or more network headers. In some instances, these one or more network headers may comprise headers added by a proxy 390 during the retransmission, this retransmission possibly including modification, of an application protocol initiation. In some instances, the one or more network headers may comprise protocol headers that may have been sent by the client 320 and may have been modified by the proxy 390. The client record component 460 may record the one or more network headers in the malformed network connection initiation record 580.

Figure 5B:
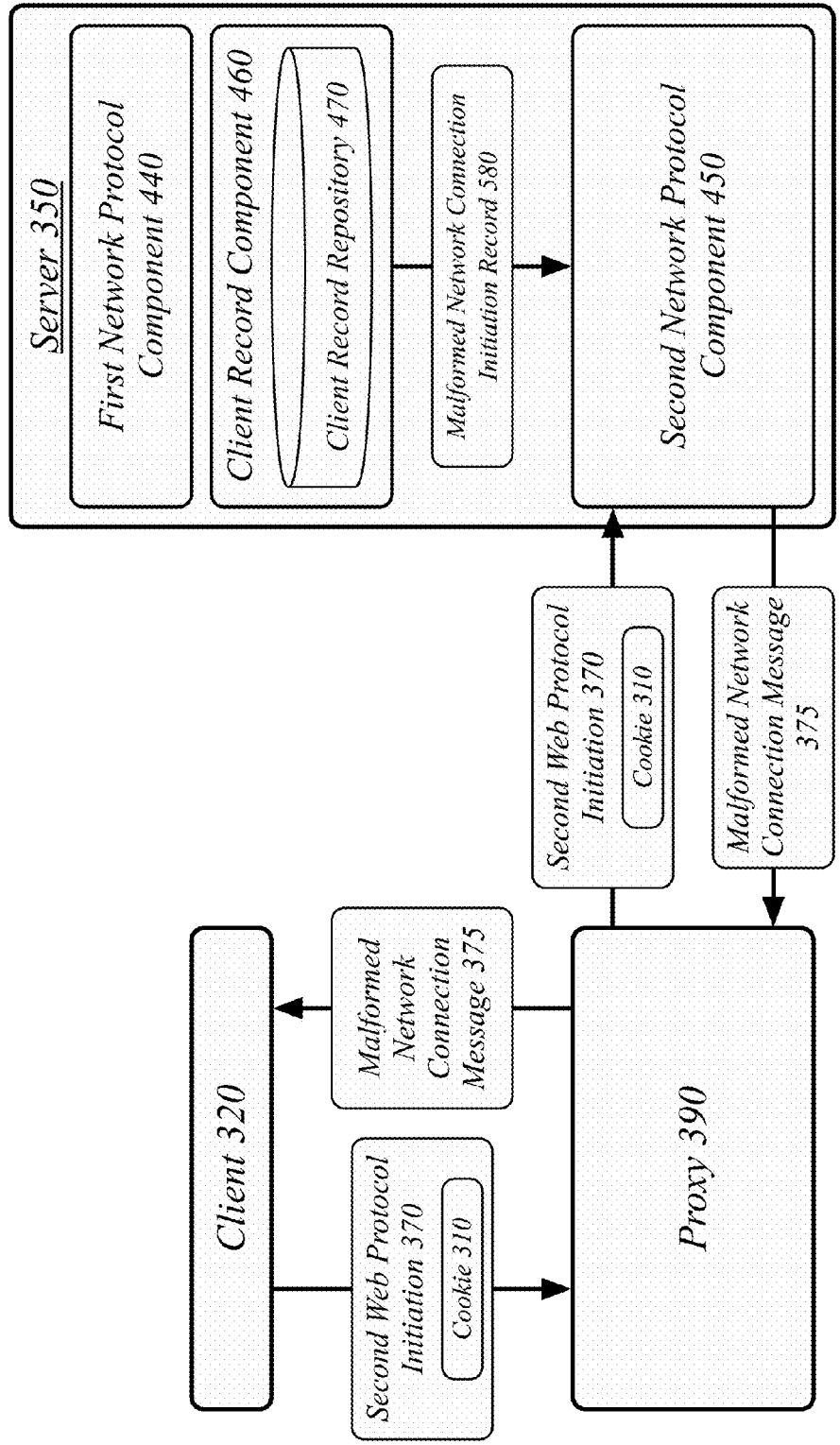
FIG. 5B illustrates an embodiment of a second web protocol initiation.

FIG. 5B illustrates an embodiment of a second web protocol initiation.

The second network protocol component 450 may receive another network connection initiation attempt from the client 320, this network connection initiation attempt based on the second network communication protocol. The client 320 may perform this network connection initiation attempt automatically in response to the server 350 rejecting the network connection initiation attempt that used the first network communication protocol.

The second network protocol component 450 may determine that this network connection initiation attempt includes a cookie 310 and extract the cookie 310 from the network connection initiation attempt. This cookie 310 may comprise the client identifier.

The client record component 460 may retrieve the malformed network connection initiation record 580 based on the client identifier. The second network protocol component 450 may configure a malformed network connection message 375 based on the malformed network connection initiation record 580. The second network protocol component 450 may transmit the malformed network connection message 375 to the client 320. Where the malformed network connection initiation record 580 includes one or more network headers, the second network protocol component 450 may transmit the one or more network headers to the client as part of the malformed network connection message 375.

The client record component 460 may identify a proxy server type based on the network connection initiation attempt and specifically based on the malformed network connection initiation record 580. The client record component 460 may be configured with one or more patterns corresponding to header information for malformed network connection initiations or, generally, header modifications made by various proxy server types. The client record component 460 may match the malformed network connection initiation record 580 against the one or more patterns to determine a proxy server type. A proxy server type may one or more of a proxy manufacturer, proxy distributer, proxy model, or other proxy identifiers.

The client record component 460 may retrieve proxy server reconfiguration information based on the proxy server type. The malformed network connection message 375 may include this proxy server reconfiguration information. Proxy server reconfiguration information may comprise textual or other information made available to a user to inform the user or, for instance and without limitation, a network administrator associated with the user of how to reconfigure a proxy to allow for the operation of a web application using the first network communication protocol.

The malformed network connection message 375 may instruct the client 320 to refrain from further network connection attempts. The malformed network connection message 375 may comprise an instruction, flag, or other signifier communicating that the failure to establish a network connection using the application protocol is the result of a proxy 390 incorrectly modifying application protocol initiation attempts. The client 320 may generally be configured to automatically retry application protocol initiation attempts when a subsequent web protocol initiation attempt is successful. The client 320 may be configured to refrain from automatically retrying application protocol initiation attempts when a malformed network connection message 375 is received.

In some embodiments, the second network protocol component 450 may clear the cookie 310 from the client 320 based on transmitting the malformed network connection message 375 to the client 320. Where the cookie 310 was placed on the client in response to a malformed application protocol initiation, the cookie 310 may be removed once the information regarding the malformed application protocol initiation is communicated to the client 310. This may serve to further the privacy of the client 320 and its user by removing an identifying client identifier from the client 320 once its has been used.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
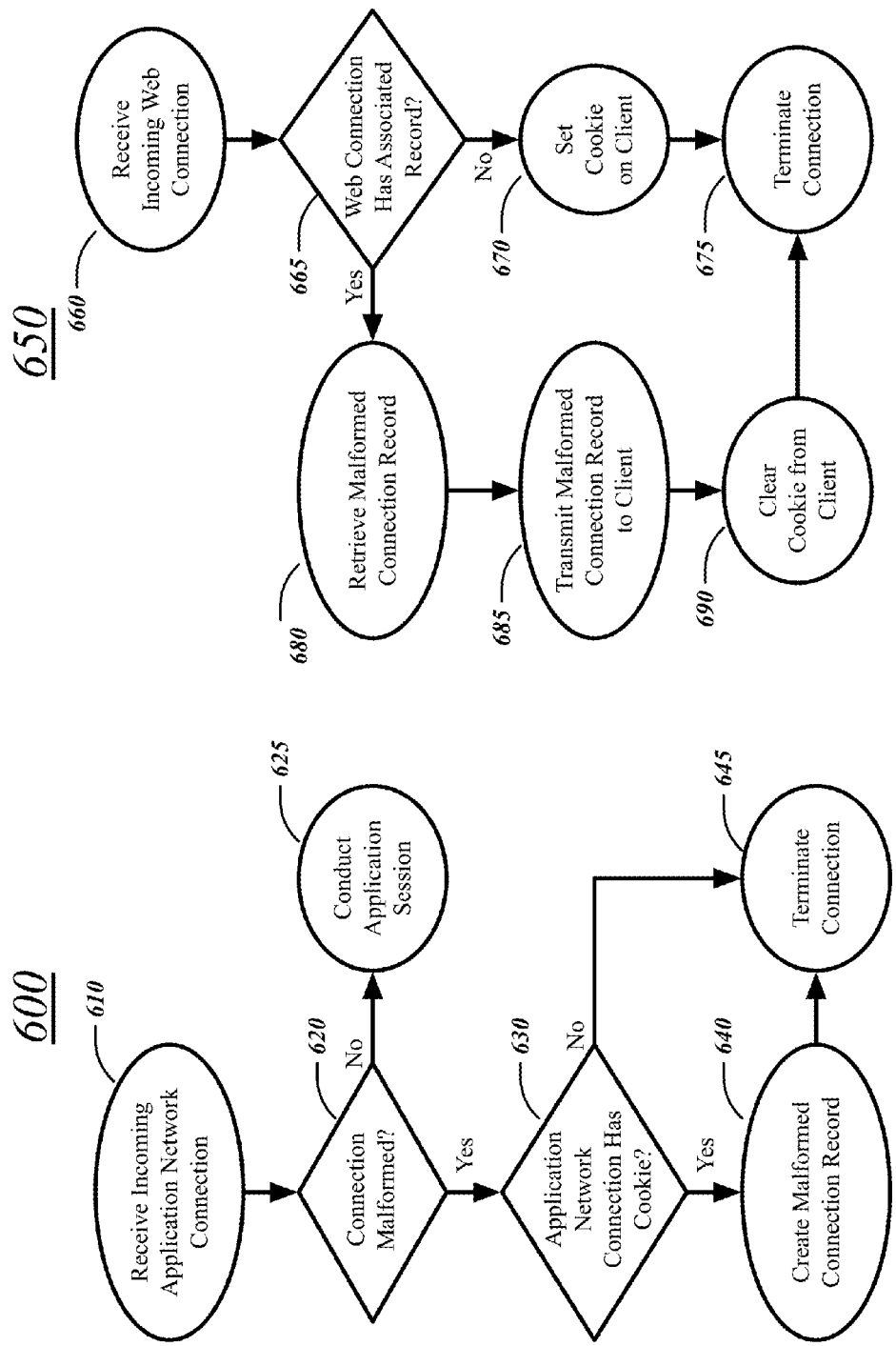
FIG. 6 illustrates an embodiment of branching logic flows for the system of FIG. 1.

FIG. 6 illustrates an embodiment of a first branching logic flow 600 and a second branching logic flow 650 for the system of FIG. 1. The logic flows 600, 650 may be representative of some or all of the operations executed by one or more embodiments described herein.

The logic flow 600 may correspond to a logic flow initiated in response to an incoming application network connection. The logic flow 600 may correspond to some or all of the logic flow for a first network protocol component 440.

The logic flow 600 may receive an incoming application network connection at block 610. The logic flow 600 may then proceed to block 620.

The logic flow 600 may determine whether the incoming application network connection is malformed at block 620. If the incoming application network connection is malformed, the logic flow 600 may proceed to block 630. If the incoming application network connection is not malformed, the logic flow 600 may proceed to block 625.

The logic flow 600 may conduct an application session at block 625. As the incoming application network connection was not malformed, the logic flow 600 may conduct one or more application transactions in service of the operations of the server system, such as may comprise the performance of the operations of a messaging system 110.

The logic flow 600 may determine whether the application network connection was received in association with a cookie 310. If the application network connection was received in association with a cookie 310, the logic flow 600 may proceed to block 640. If the application network connection was not received in association with a cookie 310, the logic flow 600 may proceed to block 645.

The logic flow 600 may create a malformed network connection initiation record 580 at block 640. Because the cookie 310 is available, the logic flow 600 can create a malformed network connection initiation record 580 that can be associated with the client 320 based on the client identifier stored in the cookie 310. This then sets the proxy interference detection system 100 in a position to be able to provide the information from the malformed network connection initiation record 580 to the client 320 during a subsequent web connection. The logic flow 600 may then proceed to block 645.

The logic flow 600 may terminate the connection at block 645. With the connection being malformed, and the logic flow 600 having created the malformed network connection initiation record 580 where the cookie 310 is available, the productive actions of the logic flow 600 have concluded.

The logic flow 650 may correspond to a logic flow initiated in response to an incoming web connection. The logic flow 650 may correspond to some or all of the logic flow for a second network protocol component 450.

The logic flow 650 may receive an incoming web connection at block 660. The logic flow 650 may then proceed to block 665.

The logic flow 650 may determine whether the web connection has an associated record at block 665. The logic flow 650 may determine whether the web connection included a cookie 310. Where a cookie 310 is present, the logic flow 650 may check whether a malformed network connection initiation record 580 associated with a client identifier stored in the cookie 310 is available. If the record is available, the logic flow 650 may proceed to block 680. If the record is not available, the logic flow 650 may proceed to block 670.

The logic flow 650 may set a cookie 310 on the client 320 at block 670. The cookie 310 may comprise a client identifier identifying the client 320. The logic flow 650 may then proceed to block 675.

The logic flow 650 may retrieve the malformed network connection initiation record 580 at block 680. The logic flow 650 may then proceed to block 685.

The logic flow 650 may transmit the malformed network connection initiation record 580 to the client 320 at block 685. The logic flow 650 may then proceed to block 690.

The logic flow 650 may clear the cookie 310 from the client 320 at block 690. However, in some embodiments, such as where the cookie 310 is a preexisting cookie used for purposes other than the identification of a client associated with a malformed network connection, the cookie 310 may not be cleared from the client 320. The logic flow may then proceed to block 675.

The logic flow 650 may terminate the connection at block 675. Either the malformed network connection initiation record 580 has been broadcast to the client 320 to inform the client 320 of the source of their inability to productively connect to the server 320, or the cookie 310 has been set on the client to prepare the proxy interference detection system 100 for the recording of the malformed network connection initiation record 580 and eventual transmission to the client 320. As such, the productive actions of the logic flow 650 have concluded.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may receive a first network connection initiation attempt from a client at a server, the first network connection initiation attempt based on a first network communication protocol at block 702.

The logic flow 700 may determine that the first network connection initiation attempt is malformed at block 704.

The logic flow 700 may extract a cookie from the first network connection initiation attempt, the cookie comprising a client identifier at block 706.

The logic flow 700 may record a malformed network connection initiation record in response to determining that the first network connection initiation attempt is malformed, the malformed network connection initiation record associated with the client based on the client identifier at block 708.

The logic flow 700 may reject the first network connection initiation attempt based on the first network connection initiation attempt being malformed at block 710.

The logic flow 700 may receive a second network connection initiation attempt from the client at the server, the second network connection initiation attempt based on a second network communication protocol at block 712.

The logic flow 700 may extract the cookie from the second network connection initiation attempt, the cookie comprising the client identifier at block 714.

The logic flow 700 may retrieve the malformed network connection initiation record based on the client identifier at block 716.

The logic flow 700 may transmit a malformed network connection message to the client based on the malformed network connection initiation record at block 718.

The embodiments are not limited to this example.

Figure 8:
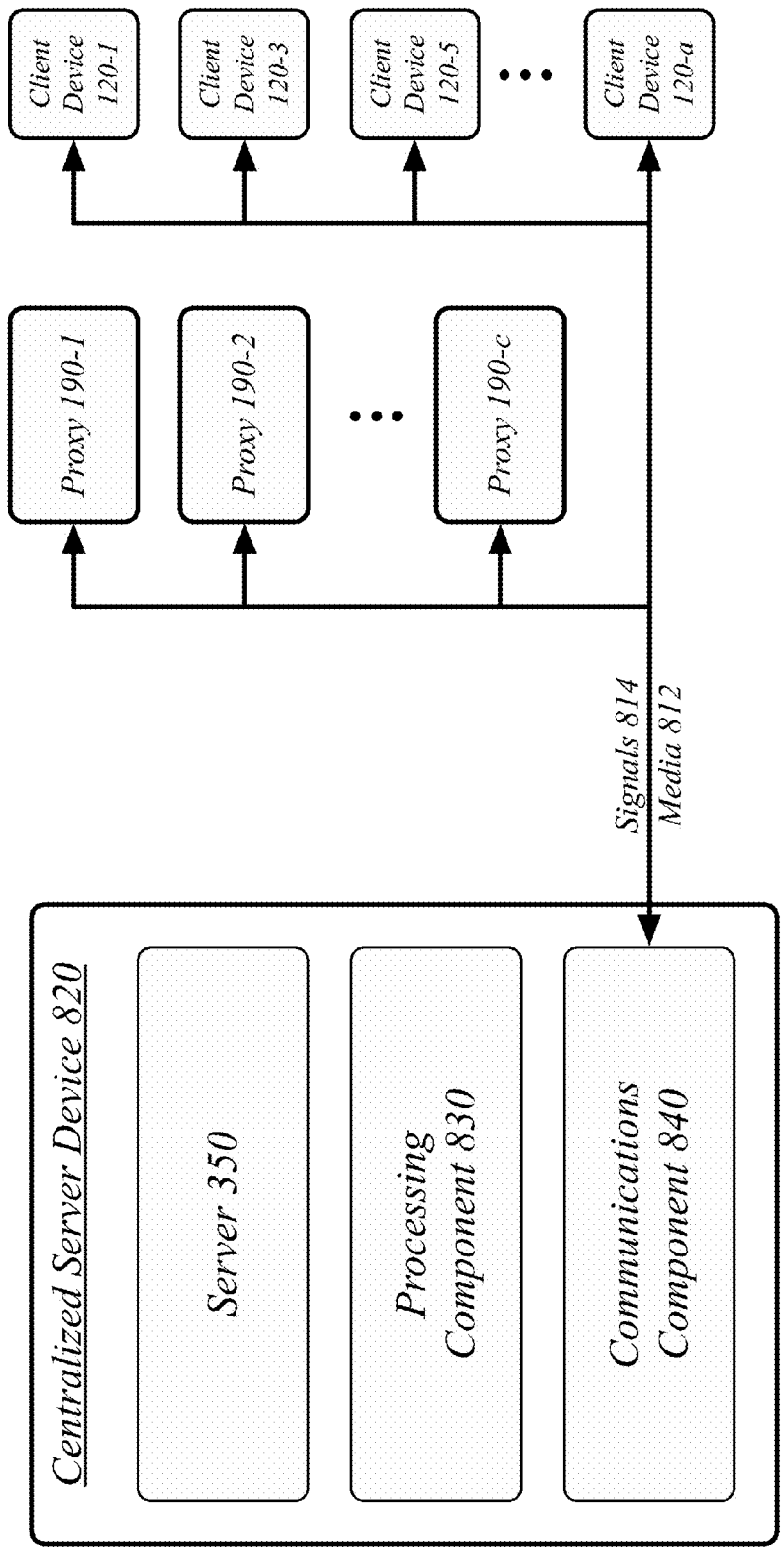
FIG. 8 illustrates an embodiment of a centralized system for the system of FIG. 1.

FIG. 8 illustrates a block diagram of a centralized system 800. The centralized system 800 may implement some or all of the structure and/or operations for the proxy interference detection system 100 in a single computing entity, such as entirely within a single centralized server device 820.

The centralized server device 820 may comprise any electronic device capable of receiving, processing, and sending information for the proxy interference detection system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 820 may execute processing operations or logic for the proxy interference detection system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 820 may execute communications operations or logic for the proxy interference detection system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 820 may execute the server 350, including the first network protocol component 440, second network protocol component 450, and client record component 460. The centralized server device 820 may communicate with other devices over a communications media 812 using communications signals 814 via the communications component 840. The centralized server device 820 may communicate with client devices 120, such as may be mediated by proxies 190, with the client devices 120 possibly including an execution of the client 320.

Figure 9:
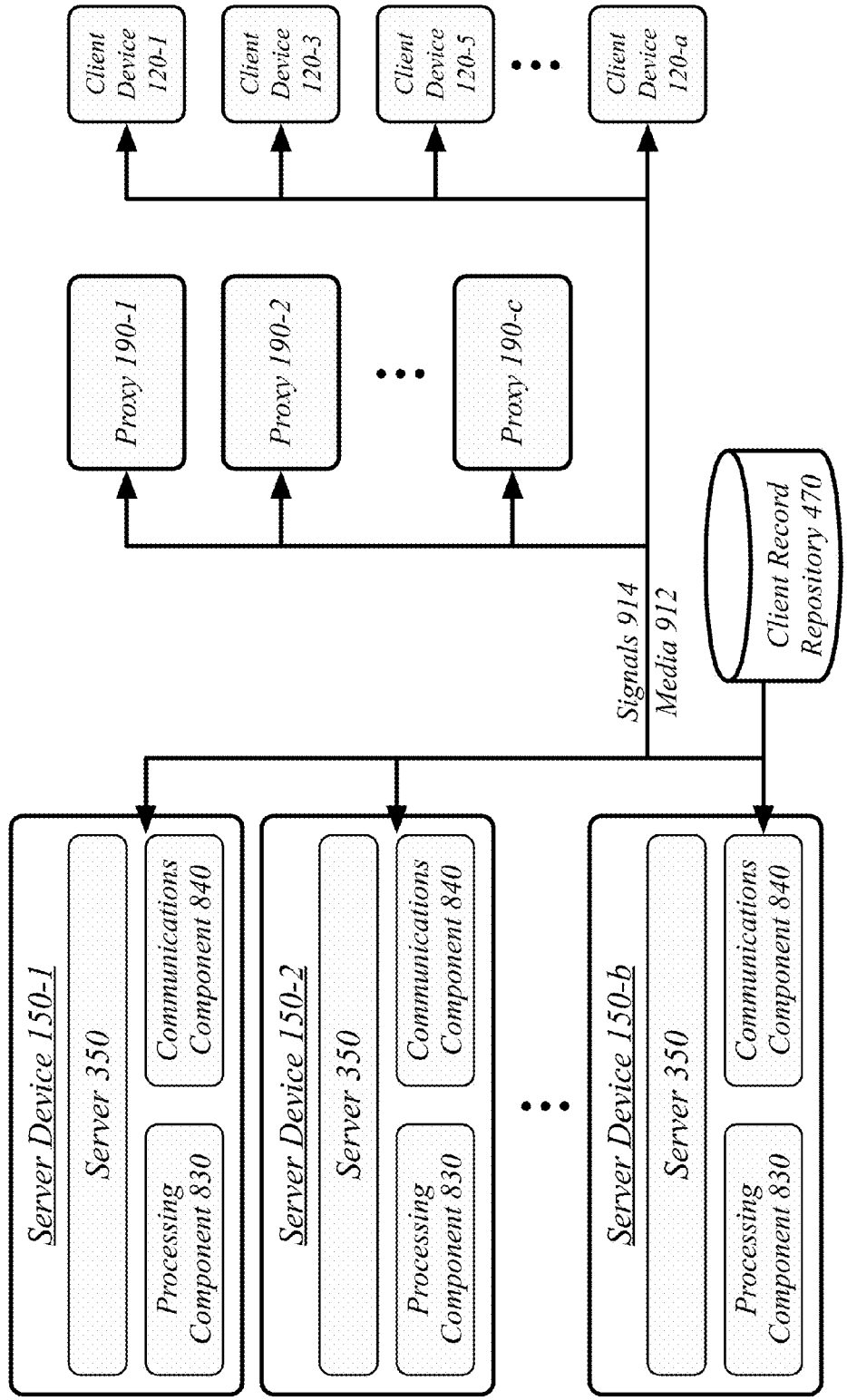
FIG. 9 illustrates an embodiment of a distributed system for the system of FIG. 1.

FIG. 9 illustrates a block diagram of a distributed system 900. The distributed system 900 may distribute portions of the structure and/or operations for the proxy interference detection system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a plurality of server devices 150. In general, the server devices 150 may be the same or similar to the centralized server device 820 as described with reference to FIG. 8. For instance, the server devices 150 may each comprise a processing component 930 and a communications component 940 which are the same or similar to the processing component 830 and the communications component 840, respectively, as described with reference to FIG. 8. In another example, the server devices 150 may communicate over a communications media 912 using communications signals 914 via the communications components 940.

The server devices 150 may comprise or employ one or more programs that operate to perform various methodologies in accordance with the described embodiments. In one embodiment, for example, the server devices 150 may collectively the server 350 as a distributed server 350. The server devices 150 may each execute one or more server applications that collectively comprise a distributed server 350. The server devices 150 may communicate with the client devices 120, such as may include an execution of the client 320, as intermediated by one or more proxies 190, such as may include the proxy 390. In some embodiments, the client record repository 470 may be an external device to the server devices 150, such as may be stored in a single or distributed storage device or storage system.

Figure 10:
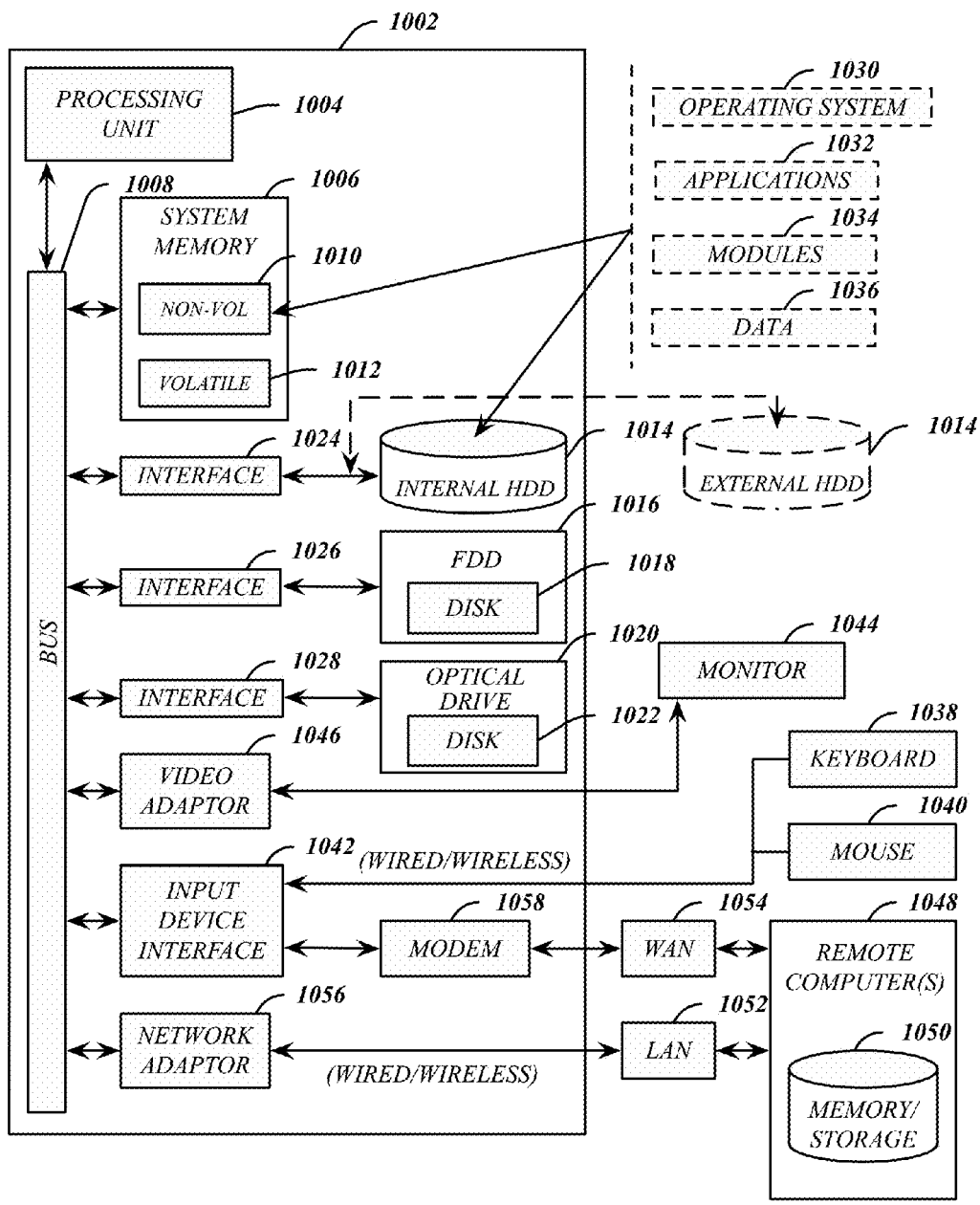
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 8, 9, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the proxy interference detection system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.10 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.10x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
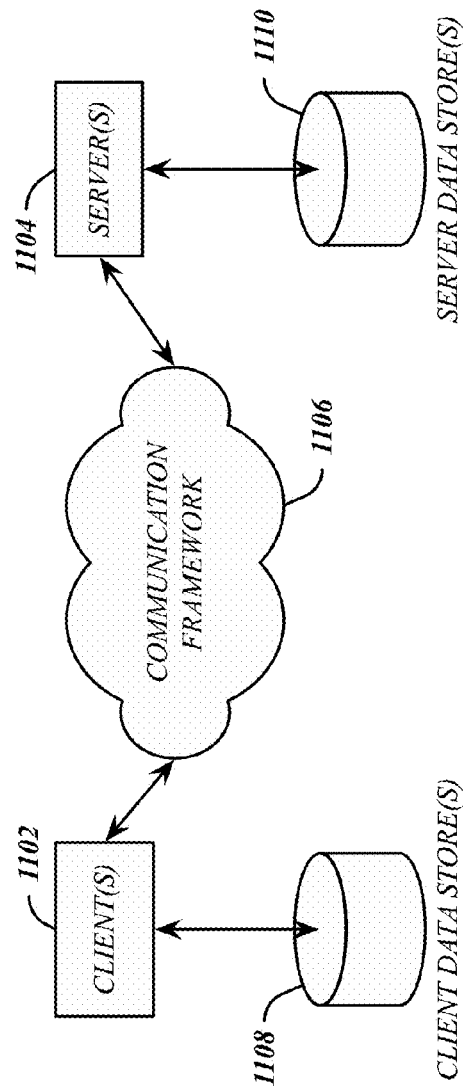
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may implement the client devices 120. The servers 1104 may implement the server devices 150, 820. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

A computer-implemented method may comprise receiving a first network connection initiation attempt from a client at a server, the first network connection initiation attempt based on a first network communication protocol; determining that the first network connection initiation attempt is malformed; extracting a cookie from the first network connection initiation attempt, the cookie comprising a client identifier; recording a malformed network connection initiation record in response to determining that the first network connection initiation attempt is malformed, the malformed network connection initiation record associated with the client based on the client identifier; rejecting the first network connection initiation attempt based on the first network connection initiation attempt being malformed; receiving a second network connection initiation attempt from the client at the server, the second network connection initiation attempt based on a second network communication protocol; extracting the cookie from the second network connection initiation attempt, the cookie comprising the client identifier; retrieving the malformed network connection initiation record based on the client identifier; and transmitting a malformed network connection message to the client based on the malformed network connection initiation record.

A computer-implemented method may further comprise the first network communication protocol comprising a full-duplex communication protocol comprising an emulation of a hypertext transport protocol handshake, the second network communication protocol comprising a hypertext transport protocol.

A computer-implemented method may further comprise receiving a previous network connection initiation attempt from the client at the server, the previous network connection initiation attempt based on the second network communication protocol; and setting the cookie on the client in response to the previous network connection initiation attempt.

A computer-implemented method may further comprise the previous network connection initiation attempt performed automatically by the client in response to the server rejecting a previous first network connection initiation attempt, the previous network connection initiation attempt based on the first network communication protocol.

A computer-implemented method may further comprise the second network connection initiation attempt performed automatically by the client in response to the server rejecting the first network connection initiation attempt.

A computer-implemented method may further comprise the first network connection initiation attempt malformed based on a header modification made by a proxy retransmitting the first network connection initiation attempt.

A computer-implemented method may further comprise identifying a proxy server type based on the first network connection initiation attempt; retrieving proxy server reconfiguration information based on the proxy server type, the malformed network connection message comprising the proxy server reconfiguration information.

A computer-implemented method may further comprise the first network connection initiation attempt comprising one or more network headers, further comprising: recording the one or more network headers in the malformed network connection initiation record; and transmitting the one or more network headers to the client as part of the malformed network connection message.

A computer-implemented method may further comprise the client comprising a web application executing within a web browser.

A computer-implemented method may further comprise the malformed network connection message instructing the web application to refrain from network connection attempts.

A computer-implemented method may further comprise clearing the cookie from the client based on transmitting the malformed network connection message to the client.

An apparatus may comprise a processor circuit on a server device; a network interface controller on the server device; a first network protocol component operative on the processor circuit to receive a first network connection initiation attempt from a client via the network interface controller at the server device, the first network connection initiation attempt based on a first network communication protocol; determine that the first network connection initiation attempt is malformed; extract a cookie from the first network connection initiation attempt, the cookie comprising a client identifier; and reject the first network connection initiation attempt based on the first network connection initiation attempt being malformed; a client record component operative on the processor circuit to record a malformed network connection initiation record in response to determining that the first network connection initiation attempt is malformed, the malformed network connection initiation record associated with the client based on the client identifier; and retrieve the malformed network connection initiation record based on the client identifier; and a second network protocol component operative on the processor circuit to receive a second network connection initiation attempt from the client at the server, the second network connection initiation attempt based on a second network communication protocol; extract the cookie from the second network connection initiation attempt, the cookie comprising the client identifier; and transmit a malformed network connection message to the client based on the malformed network connection initiation record. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving a first network connection initiation attempt from a proxy at a server, the first network connection initiation attempt associated with a client and based on a first network communication protocol;
   determining that the first network connection initiation attempt is malformed;
   extracting a cookie from the first network connection initiation attempt, the cookie comprising a client identifier;
   recording a malformed network connection initiation record in response to determining that the first network connection initiation attempt is malformed, the malformed network connection initiation record associated with the client based on the client identifier;
   rejecting the first network connection initiation attempt based on the first network connection initiation attempt being malformed;
   receiving a second network connection initiation attempt from the proxy at the server, the second network connection initiation attempt associated with the client and based on a second network communication protocol;
   extracting the cookie from the second network connection initiation attempt, the cookie comprising the client identifier;
   retrieving the malformed network connection initiation record based on the client identifier; and
   transmitting a malformed network connection message to the client based on the malformed network connection initiation record.

2. The method of claim 1, comprising:
   receiving a previous network connection initiation attempt from the proxy, the previous network connection initiation attempt associated with the client, at the server, the previous network connection initiation attempt based on the second network communication protocol; and
   setting the cookie on the client in response to the previous network connection initiation attempt.

3. The method of claim 1, the second network connection initiation attempt performed automatically by the client in response to the server rejecting the first network connection initiation attempt.

4. The method of claim 1, the first network connection initiation attempt malformed based on a header modification made by the proxy retransmitting the first network connection initiation attempt.

5. The method of claim 1, further comprising:
   identifying a proxy server type based on the first network connection initiation attempt; and
   retrieving proxy server reconfiguration information based on the proxy server type, the malformed network connection message comprising the proxy server reconfiguration information.

6. The method of claim 1, the first network connection initiation attempt comprising one or more network headers, further comprising:
   recording the one or more network headers in the malformed network connection initiation record; and
   transmitting the one or more network headers to the client as part of the malformed network connection message.

7. The method of claim 1, the client comprising a web application executing within a web browser.

8. The method of claim 1, the malformed network connection message instructing the client to refrain from network connection attempts.

9. An apparatus, comprising:
a processor circuit on a server device;
a network interface controller on the server device;
a first network protocol component operative on the processor circuit to receive a first network connection initiation attempt from a proxy via the network interface controller at the server device, the first network connection initiation attempt associated with a client and based on a first network communication protocol; determine that the first network connection initiation attempt is malformed; extract a cookie from the first network connection initiation attempt, the cookie comprising a client identifier; and reject the first network connection initiation attempt based on the first network connection initiation attempt being malformed;
a client record component operative on the processor circuit to record a malformed network connection initiation record in response to determining that the first network connection initiation attempt is malformed, the malformed network connection initiation record associated with the client based on the client identifier; and retrieve the malformed network connection initiation record based on the client identifier; and
a second network protocol component operative on the processor circuit to receive a second network connection initiation attempt from the proxy at the server, the second network connection initiation attempt associated with the client and based on a second network communication protocol; extract the cookie from the second network connection initiation attempt, the cookie comprising the client identifier; and transmit a malformed network connection message to the client based on the malformed network connection initiation record.

10. The apparatus of claim 9, further comprising:
the second network protocol component operative to receive a previous network connection initiation attempt from the proxy, the previous network connection initiation attempt associated with the client, at the server, the previous network connection initiation attempt based on the second network communication protocol; and
set the cookie on the client in response to the previous network connection initiation attempt.

11. The apparatus of claim 9, the second network connection initiation attempt performed automatically by the client in response to the server rejecting the first network connection initiation attempt.

12. The apparatus of claim 9, the first network connection initiation attempt malformed based on a header modification made by the proxy retransmitting the first network connection initiation attempt.

13. The apparatus of claim 9, further comprising:
the client record component operative to identify a proxy server type based on the first network connection initiation attempt; and retrieve proxy server reconfiguration information based on the proxy server type, the malformed network connection message comprising the proxy server reconfiguration information.

14. The apparatus of claim 9, the malformed network connection message instructing the client to refrain from network connection attempts.

15. At least one non-transitory computer-readable storage medium comprising instructions that, when executed, cause a system to:
receive a first network connection initiation attempt from a proxy at a server, the first network connection initiation attempt associated with a client and based on a first network communication protocol;
determine that the first network connection initiation attempt is malformed;
extract a cookie from the first network connection initiation attempt, the cookie comprising a client identifier;
record a malformed network connection initiation record in response to determining that the first network connection initiation attempt is malformed, the malformed network connection initiation record associated with the client based on the client identifier;
reject the first network connection initiation attempt based on the first network connection initiation attempt being malformed;
receive a second network connection initiation attempt from the proxy at the server, the second network connection initiation attempt associated with the client and based on a second network communication protocol;
extract the cookie from the second network connection initiation attempt, the cookie comprising the client identifier;
retrieve the malformed network connection initiation record based on the client identifier; and
transmit a malformed network connection message to the client based on the malformed network connection initiation record.

16. The computer-readable storage medium of claim 15, comprising further instructions that, when executed, cause a system to:
receive a previous network connection initiation attempt from the proxy, the previous network connection initiation attempt associated with the client, at the server, the previous network connection initiation attempt based on the second network communication protocol; and
set the cookie on the client in response to the previous network connection initiation attempt.

17. The computer-readable storage medium of claim 15, the second network connection initiation attempt performed automatically by the client in response to the server rejecting the first network connection initiation attempt.

18. The computer-readable storage medium of claim 15, the first network connection initiation attempt malformed based on a header modification made by the proxy retransmitting the first network connection initiation attempt.

19. The computer-readable storage medium of claim 15, comprising further instructions that, when executed, cause a system to:
identify a proxy server type based on the first network connection initiation attempt; and
retrieve proxy server reconfiguration information based on the proxy server type, the malformed network connection message comprising the proxy server reconfiguration information.

20. The computer-readable storage medium of claim 15, the malformed network connection message instructing the client to refrain from network connection attempts.

* * * * *